United States Patent [19]
Miyagi et al.

[11] Patent Number: 5,894,471
[45] Date of Patent: Apr. 13, 1999

[54] ATM NETWORK SYSTEM AND CONNECTION ADMISSION CONTROL METHOD

[75] Inventors: Morihito Miyagi, Kodaira; Junichirou Yanagi, Yokohama, both of Japan

[73] Assignee: Hitachi, Ltd., Tokyo, Japan

[21] Appl. No.: 08/746,874

[22] Filed: Nov. 15, 1996

[30] Foreign Application Priority Data

Nov. 17, 1995 [JP] Japan .................... 7-299545

[51] Int. Cl.$^6$ .................... H04J 1/16; H04J 3/14
[52] U.S. Cl. .................... 370/230
[58] Field of Search .................... 370/381, 389, 370/395, 397, 399, 409, 412, 422, 535, 537, 540, 905, 229, 230, 235, 236, 468

[56] References Cited

U.S. PATENT DOCUMENTS

| | | | |
|---|---|---|---|
| 5,392,402 | 2/1995 | Robrock, II | 395/200 |
| 5,530,698 | 6/1996 | Kozaki et al. | 370/355 |
| 5,623,492 | 4/1997 | Teraslinna | 370/397 |
| 5,623,493 | 4/1997 | Kagemoto | 370/397 |
| 5,633,869 | 5/1997 | Burnett et al. | 370/396 |

OTHER PUBLICATIONS

"Functional Characteristics of ATM Equipment" General Aspects of Digital Transmission Systems International Telecommunication Union 1.732 (Draft) Nov. 1995.

*Primary Examiner*—Ajit Patel
*Attorney, Agent, or Firm*—Antonelli, Terry, Stout & Kraus, LLP

[57] ABSTRACT

Apparatus for executing the connection admission control for PVC and SVC efficiently in an ATM network system which includes a network management equipment and a network equipment. The control function of the network management equipment executes resource allocation to PVC and SVC and notifies the network equipment of resource management information for SVC. For a request of PVC setup, the control function of the network management equipment executes the connection admission control for PVC and notifies the network equipment of the admission result. For a request of SVC setup, the network equipment executes the connection admission control for SVC. Communication overhead is reduced since it is not necessary to inquire the network equipment about connection admission from the network management equipment during PVC setup. Furthermore, the network equipment can count call blocking of SVC.

24 Claims, 14 Drawing Sheets

| | 501 | 502 | 503 | 504 | 505 | 506 | 500 |
|---|---|---|---|---|---|---|---|
| | FIELD 1 | FIELD 2 | FIELD 3 | FIELD 4 | FIELD 5 | FIELD 6 | |
| | NETWORK EQUIPMENT IDENTIFYING NUMBER | LINE INTERFACE IDENTIFYING NUMBER | VPC IDENTIFYING NUMBER | ALLOCATED BANDWIDTH FOR VPC | TOTAL BANDWIDTH ALLOCATABLE TO PVCCs | VCI RANGE ASSIGNABLE TO PVCCs | |
| | X | Y | 1 | 20 Mbit/s | 20 Mbit/s | ≦FFFF(H) | |
| | X | Y | 2 | 50 Mbit/s | 10 Mbit/s | ≦3FFF(H) | |
| | ⋮ | ⋮ | ⋮ | ⋮ | ⋮ | ⋮ | |
| | X | Y | M | 15 Mbit/s | 15 Mbit/s | ≦FFFF(H) | |

FIG. 13

| MESSAGE IDENTIFIER | | LENGTH OF THE MESSAGE | |
|---|---|---|---|
| LINE INTERFACE IDENTIFYING NUMBER =Y | VPC IDENTIFYING NUMBER =1 | NUMBER OF CALL BLOCKING DUE TO THE LACK OF BANDWIDTH =NULL | NUMBER OF CALL BLOCKING DUE TO THE LACK OF VCI VALUES =NULL |
| Y | 2 | 20 | 1 |
| ... | ... | ... | ... |
| Y | M | =NULL | =NULL |

- 706 HEADER
- 707
- 708 MESSAGE IDENTIFIER
- 709 LENGTH OF THE MESSAGE
- 710-1
- 710-2
- 710-N
- 711 TRAILER

ATM NETWORK SYSTEM AND CONNECTION ADMISSION CONTROL METHOD

BACKGROUND OF THE INVENTION

The present invention relates to an ATM (asynchronous transfer mode) network system and more particularly to PVC and SVC resource management in an ATM network, a method for connection admission control, and a system configuration.

In this specification, the following abbreviations are used:
- PVC: Permanent virtual connection
  SVC: Switched virtual connection
  VPC: Virtual path connection
  VCC: Virtual channel connection
  PVPC: Permanent virtual path connection
  PVCC: Permanent virtual channel connection
  SVCC: Switched virtual channel connection
  ITU-T (International Telecommunication Union—Telecommunication Standardization Sector) Recommendation I.732

"Functional characteristics of ATM equipment" (hereinafter expressed by Draft I. 732) specifies the function model of the ATM network equipment (ATM exchange or ATM crossconnect). According to the Draft I. 732 mentioned above, the connection admission control function for setting the VPC or VCC is arranged in the ATM network equipment.

FIG. 14 shows a function model for connection admission control in an ATM network equipment 200 extracted from FIG. 6.1 of the Draft I. 732.

The network equipment 200 has a signaling application 800 for controlling SVC connected to a terminal equipment or another network equipment, a message communications function 802 for communicating with a network management equipment for controlling PVC, and an equipment management function 801 for controlling the operation of the equipment on the basis of a message received by the message communications function 802, and the signaling application 800 has a routing table 803 for routing SVC, and the equipment management function 801 has a routing table 804 for routing PVC.

The SVC control and PVC control are executed via an application program and a function program which are different between the controls, so that a coordination function 803 is provided in the network equipment 200 so as to coordinate these controls. The coordination function 803 has a connection admission control 804 for executing the connection admission control for PVC and SVC at the same time and the connection admission control 804 comprises an admission control algorithm 805 shared by PVC and SVC, an identifier management table 806, and a bandwidth management table 807.

However, when PVC and SVC which are different in the setup method from each other are controlled in the coexisting state, the following conditions (1) to (4) are required. A term of "resource" in the following explanation in this specification indicates, for example, an identifier (VPI and VCI) and a bandwidth.

(1) The SVC setup delay time should be satisfied.

For SVC, the setup delay time is specified and it is necessary to complete setup within several hundreds ms. The network management equipment and network equipment are generally connected via a wide area network and the required communication time between them is long. Therefore, the resource management system in which the network management equipment and network equipment send and receive messages between them every connection setup cannot satisfy this request condition.

(2) The communication overhead during PVC setup should be reduced.

For PVC, the aforementioned setup delay time specified for SVC is not specified. However, for connection setup, it is desirable to reduce the communication count or the communication data amount between the network management equipment and the network equipment. The reason is that the required communication time between the network management equipment and the network equipment is long in the same way as with (1) mentioned above.

(3) The PVC and SVC can coexist in the same low-order layer.

For example, to make PVCC and SVCC coexist in the same VPC, it is necessary to allocate resources in the same VPC to a plurality of connections which are different from each other in the setup method.

(4) The call blocking of SVC setup can be counted.

When resources are insufficient during connection admission control, SVC becomes call blocking but PVC is free of call blocking. Therefore, in SVC, the resource allocation by network designing is not changed immediately at the point of time when call blocking occurs but the resource allocation is changed at the point of time when the call blocking rate (call blocking count per hour) becomes worse than a certain threshold value. On the other hand, in PVC, when connections cannot be admitted due to insufficient resources during connection admission control, the PVC resource allocation is changed immediately by network designing.

According to the conventional resource management model shown in the aforementioned Draft I. 732, as shown in FIG. 14, the connection admission control function which is one of the resource managements is arranged in the network equipment 200 and the connection admission control function is used for both PVC setup and SVC setup. When the aforementioned request conditions (1) to (4) are examined in this constitution, the following results are obtained.

(1) The SVC is set by sending and receiving messages between the network equipment 200 and the terminal equipment or another network equipment and it is not necessary to send and receive messages between the network equipment 200 and the network management equipment. Therefore, this request condition is satisfied.

(2) For PVC setup, a setup request is issued to the network management equipment first. Thereafter, the network management equipment sends the setup request to the network equipment 200 and the network equipment 200 executes connection admission control. The network management equipment obtains the result, updates the resource management data in the network management equipment, and then instructs PVC setup to the network equipment 200. Therefore, it is necessary to send and receive a message two times between the network management equipment and the network equipment 200.

(3) Since the common connection admission control 804 is applied to PVC and SVC, the resource allocation can be executed without considering the classification of PVC and SVC.

(4) Since the common connection admission control 804 is applied to PVC and SVC, the resource allocation can be executed without considering the classification of PVC and SVC. However, on the other hand, for example, it is difficult to perform an individual process such as counting call blocking for SVC but not counting call blocking for PVC.

According to the conventional resource management system as mentioned above, for the request condition (2) of reduction of the communication overhead between the network management equipment and the network equipment during PVC setup, a problem arises that it is necessary to send and receive a message two times. For the request condition (4) of counting SVC call blocking, the network equipment executes the connection admission control without considering the classification of PVC and SVC, so that it is difficult to count call blocking only of SVC.

SUMMARY OF THE INVENTION

An object of the present invention is to provide an ATM network system and a network management equipment for executing connection admission control efficiently for PVC and SVC.

Another object of the present invention is to provide an ATM network system for facilitating counting of the number of SVC call blocking.

Still another object of the present invention is to provide an improved connection admission control method for PVC and SVC coexisting in the same layer.

To solve the above problems, according to the present invention, PVC resource management information is stored in the network management equipment, and the PVC connection admission control is executed by the network management equipment, and the SVC resource management information is stored in the network equipment, and the SVC connection admission control is executed by the network equipment. In this construction, it is desirable to execute the connection admission control in the network management equipment during PVC setup and instruct PVC setup to the network equipment on the basis of the result, so that only one sending and receiving of a message is necessary and the request condition (2) can be satisfied. Furthermore, the PVC connection admission control and the SVC connection admission control can be executed independently of each other, so that the number of SVC call blocking can be counted during the SVC connection admission control and the request condition (4) can be satisfied. Since SVC is set in the same way as with the conventional case, the request condition (1) is also satisfied.

According to the present invention, to satisfy the request condition (3), during the network designing executed in the network management equipment, resource management information regarding PVC (PVCC) coexisting in the same VPC, for example, the total value of bandwidths allocatable to PVC and the VCI range (identifier information range), resource management information regarding SVC (SVCC), for example, the total value of bandwidths allocatable to SVC and the VCI range are decided, and the resource management information regarding PVC are stored in the connection admission control part for PVC in the network management equipment. The resource management information regarding SVC is notified the network equipment from the network management equipment and stored in the connection admission control part for SVC in the network equipment.

The connection admission control part for PVC in the network management equipment executes the connection admission control based on total value of bandwidths allocatable to PVC and the VCI range and when resources are insufficient, the part requests network designing modification to the network management equipment. On the other hand, the connection admission control part for SVC in the network management equipment executes the connection admission control based on the total value of bandwidths allocatable to SVC which is notified from the network management equipment and the VCI range when resources are insufficient, the part counts such insufficiency as call blocking, and notifies the network management equipment of reduction of the call blocking rate at the predetermined timing, for example, at the point of time when the call blocking rate is reduced below the predetermined threshold value, and requests network designing modification. In the aforementioned construction, the request condition (3) for coexisting PVC and SVC in the same low-order layer is satisfied.

BRIEF DESCRIPTION OF THE DRAWINGS

The foregoing and other objects, advantages, manner of operation and novel features of the present invention will be understood from the following detailed description when read in connection with the accompanying drawings wherein:

FIG. 13 shows a diagram showing the packet format for notification of call blocking data to the network management equipment from the network requirement.

EMBODIMENTS OF THE INVENTION

The embodiments of the present invention will be explained hereunder with reference to the accompanying drawings.

Firstly, the construction of the ATM network system of the present invention will be explained with reference to FIGS. 1 to 5.

Figure 1:
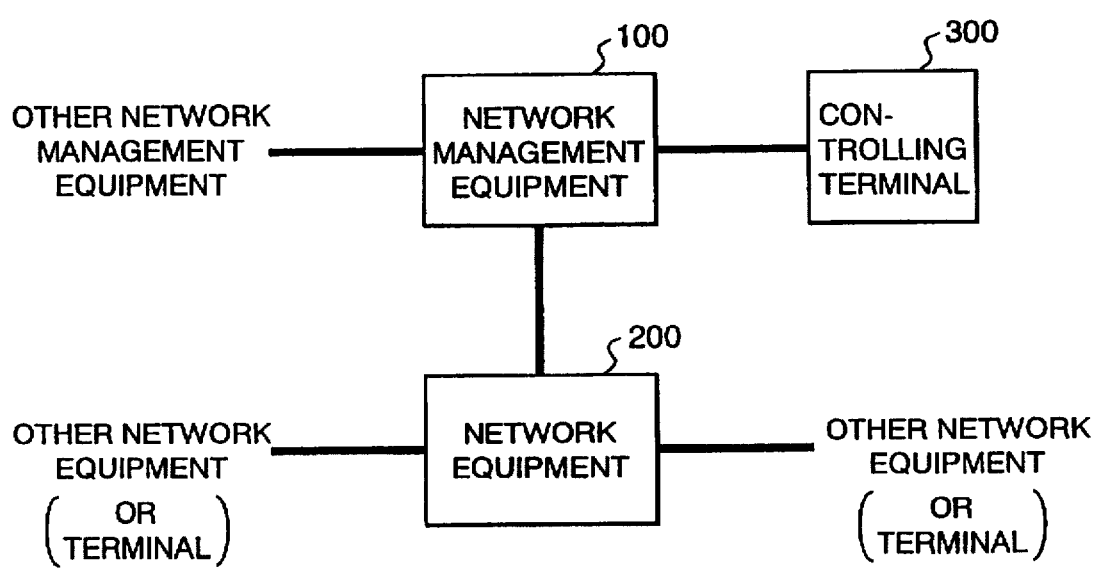
FIG. 1 is a drawing showing connection of a network management equipment and a network equipment constituting the ATM network system of the present invention.

FIG. 1 shows the connection relation of a network management equipment 100 and a network equipment 200.

The network management equipment 100 and the network equipment 200 are generally connected via a wide area network, and a controlling terminal 300 and other network management equipment are connected to the network management equipment 100, and a plurality of terminal devices or other network equipment is connected to the network equipment 200.

Figure 2:
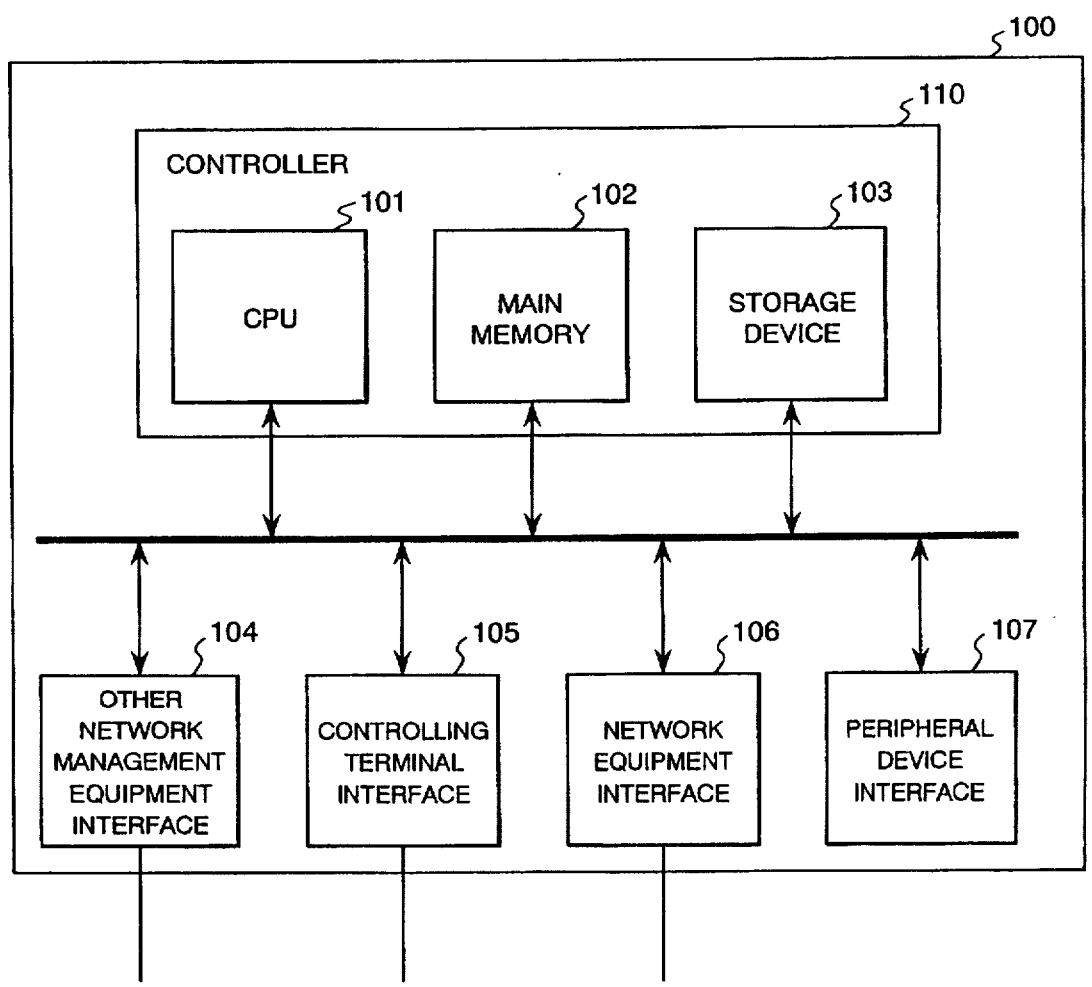
FIG. 2 is a drawing showing the constitution of the network management equipment.

FIG. 2 shows the construction of the network management equipment 100.

The network management equipment 100 comprises a controller 110 and various interfaces 104 to 107 connected to this controller via a bus. The controller 110 comprises a processor (CPU) 101, a main memory (MM) 102, and a storage device 103. The network management equipment 100 also includes the other network management equipment interface 104, the controlling terminal interface 105, the network equipment interface 106, and the peripheral device (display device, etc.) interface 107. In FIG. 1, only one network management equipment interface 104 and one network equipment interface 106 would appear necessary. However, a plurality of interfaces 104 and 106 may exist in an actual system.

Figure 3:
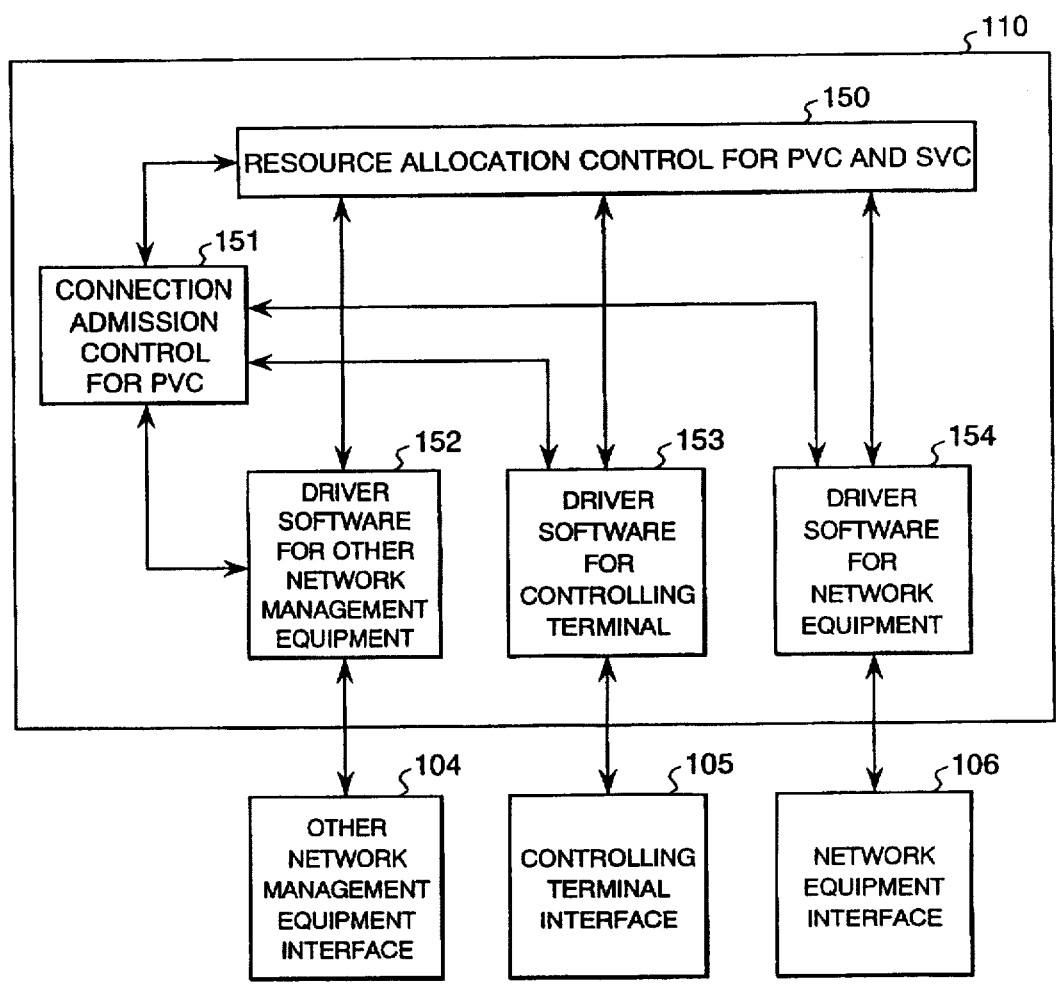
FIG. 3 is a function block diagram of a resource management program provided in a controller of the network management equipment.

FIG. 3 is a function block diagram showing the construction of the resource management program which is one of the programs executed by the CPU 101 of the controller 110.

Numeral 150 indicates a resource allocation control part for PVC and SVC for executing network designing and deciding the total value of bandwidths allocatable to PVCC and the VCI range (VCI area) and the total value of bandwidths allocatable to SVCC and the VCI range (VCI area) for PVCC and SVCC coexisting in the same VPC. Numeral 151 indicates a connection admission control part for PVC for communicating with the resource allocation control part for PVC and SVC 150 and executing the connection admission control according to the total bandwidth allocatable to PVCC coexisting in the aforementioned same VPC and the VCI range. Numeral 152 indicates a driver software for other network management equipment for performing the sending and receiving operation with the other network management equipment interface 104, 153 a driver software for controlling terminal for performing the sending and receiving operation with the controlling terminal interface 105, and 154 a driver software for network equipment for performing the sending and receiving operation with the network equipment interface 106 drivers communicate with the connection admission control part for PVC 151 and the resource allocation control part for PVC and SVC 150. In this specification, a term of "driver" includes the interface control function and the protocol processing function and when the network management equipment and the network equipment communicate with each other using a simple network management protocol (SNMP), it includes the SNMP processing function.

The connection admission control part for PVC 151 sends and receives a message for connection admission control between the part and other network management equipment via the driver software for other network management equipment 152. The connection admission control part for PVC 151 receives a request message from the controlling terminal 300 and sends an acknowledge message (notification of the processing result) to the request via the driver software for controlling terminal 153 and sends a request for PVC setup to the network equipment 200 and receives an acknowledge message to it via the driver software for network equipment 154.

Figure 4:
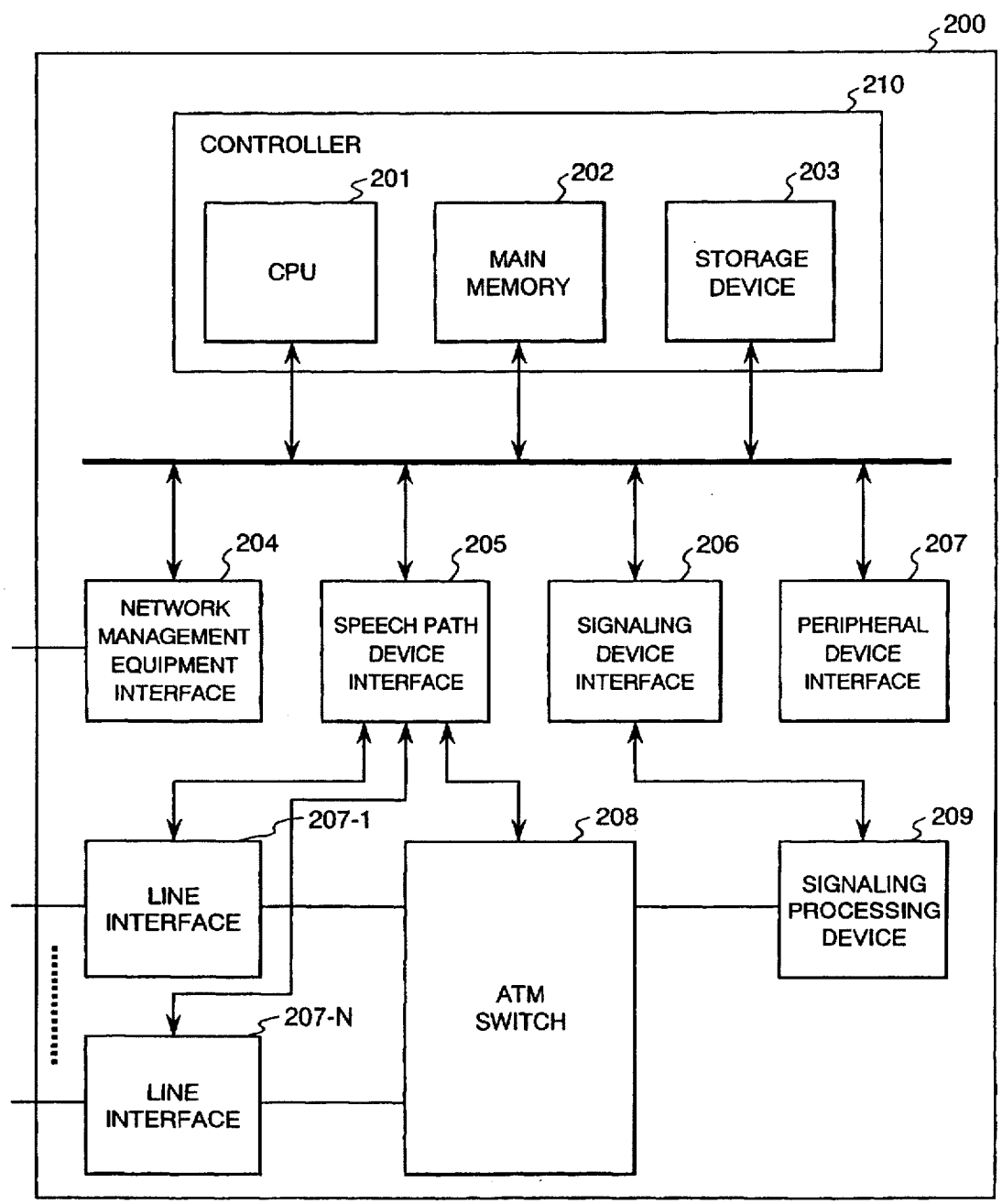
FIG. 4 is a drawing showing the constitution of the network equipment.

FIG. 4 shows the construction of the network equipment 200.

The network equipment 200 comprises an ATM switch 208 having a plurality of line interfaces 207 (207-1 to 207-N) and a signaling processing device 209, a controller 210, and various interfaces 204 to 207 connected to the controller via a bus.

The controller 210 comprises a CPU 201, a MM 202, and a storage device 203 and is connected to the network management equipment interface 204, the speech path device interface 205, the signaling device interface 206, and the peripheral device interface 207 via the bus. The speech path device interface 205 is connected to the ATM switch 208 and the line interface 207 installed for each subscriber line and the signaling device interface 206 is connected to the signaling processing device 209. An ATM cell for call control inputted from each line is distributed to the signaling processing device 209 via the ATM switch 208, assembled to a message here, and then delivered to the controller 210 via the signaling device interface 206. A control message issued by the controller 210 inversely is inputted to the signaling processing device 209 via the signaling device interface 206, converted to an ATM cell here, and then inputted to the ATM switch.

Figure 5:
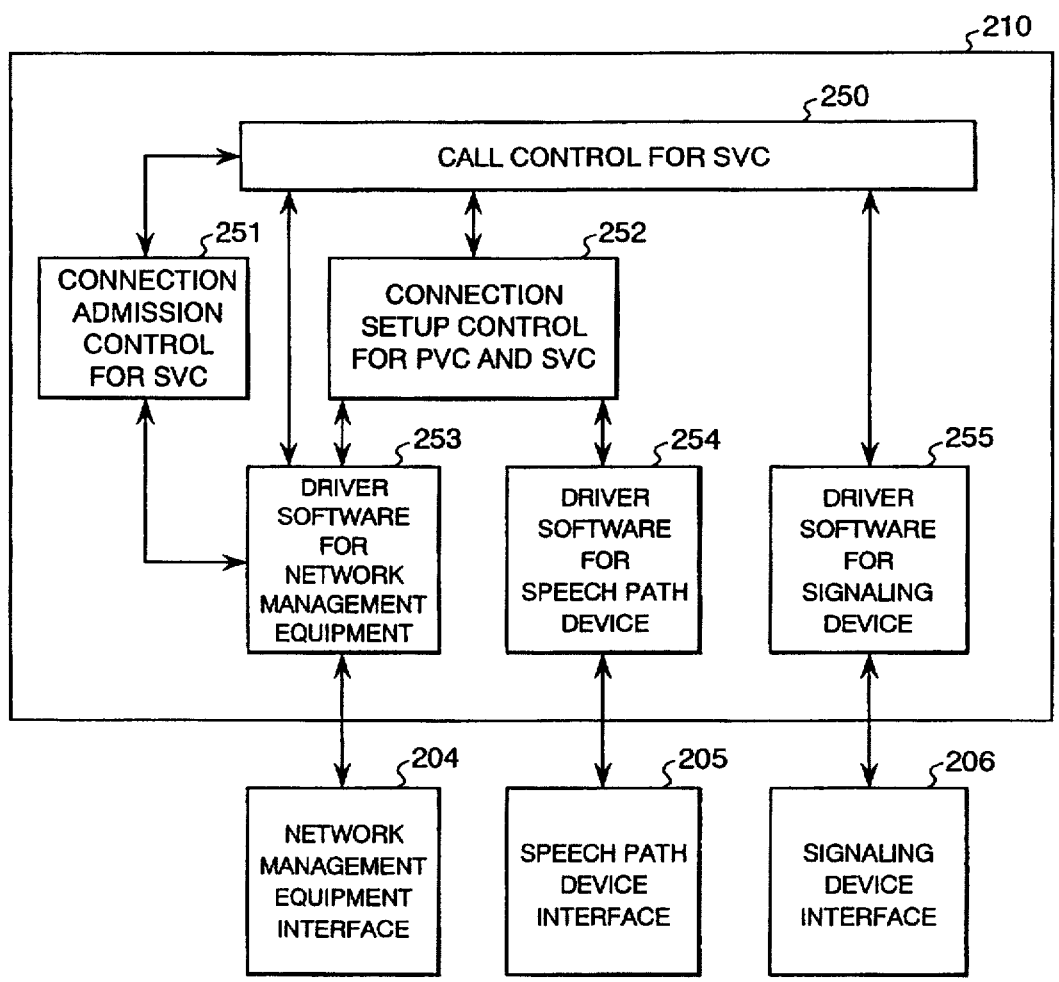
FIG. 5 is a function block diagram of a resource management program provided in a controller of the network equipment.

FIG. 5 shows a function block of a resource management program provided in the controller 210. The resource management program comprises a call control part for SVC 250 for executing layer 3 protocol control, call processing, and SVC call blocking decision, a connection admission control part for SVC 251 joined with the call control part for SVC 250, a connection setup control for PVC and SVC 252 joined with the call control part for SVC 250, a driver software for network management equipment 253 communicating with the network management equipment interface 204, a driver software for speech path device 254 communicating with the speech path device interface 205, and a driver software for signaling device 255 communicating with the signaling device interface 206.

The call control part for SVC 250 executes the connection admission control according to the total value of bandwidths allocatable to SVCC coexisting in the same VPC notified from the connection admission control part for SVC 251 and the VCI range. If denial of admission (failure of connection setup) due to the lack of resource (lack of bandwidth or identifier range) occurs, the call control part for SVC 250 counts it as call blocking and executes communication of control parameters for connection admission control with the network management equipment and notification of call blocking data via the driver software for network management equipment 253.

The driver software for network management equipment 253 and the driver software for speech path device 254 are joined with the connection setup control for PVC and SVC 252 and execute the sending and receiving control of control data with the network management equipment 100 and the speech path devices (the line interface 207 and the ATM switch 208) respectively. The connection setup control for PVC and SVC 252 receives an instruction of parameter for SVC setup from the call control part for SVC 250 and sends and receives a parameter for setup of PVC and SVC with the speech path devices 207 and 208. The driver software for signaling device 255 sends and receives parameters required by the layer 2 (this protocol processing is included in the driver software for signaling device 255 as described above in this specification) and the layer 3 with the call control part for SVC 250.

Next, the resource management tables held by the resource allocation control part for PVC and SVC 150 and the connection admission control for PVC 151 in the network management equipment 100 and the connection admission control for SVC 251 in the network equipment 200 will be explained with reference to FIGS. 6 to 8.

Firstly, resource division will be explained by referring to FIG. 6A.

According to the present invention, a bandwidth 400 of the physical layer path (for example, when the ATM line is mapped into the SDH line, the SDH transmission path is equivalent to a physical layer path) is divided into a plurality of bandwidths 401-1 to 401-M corresponding to VPCs. Each bandwidth 401-i (i=1, 2, - - -, M) corresponding to VPCs is further divided into a plurality of bandwidths 402 and 403 fixedly and allocated to a plurality of PVCCs and a plurality of SVCCs which are logically multiplexed in each VPC. However, the aforementioned fixed division ratio can be changed by network designing and these divided bandwidths are set as the total bandwidth allocatable to PVCC (total of bandwidths) 402 and the total bandwidth allocatable to SVCC (total of bandwidths) 403.

Figures 6A, 6B:
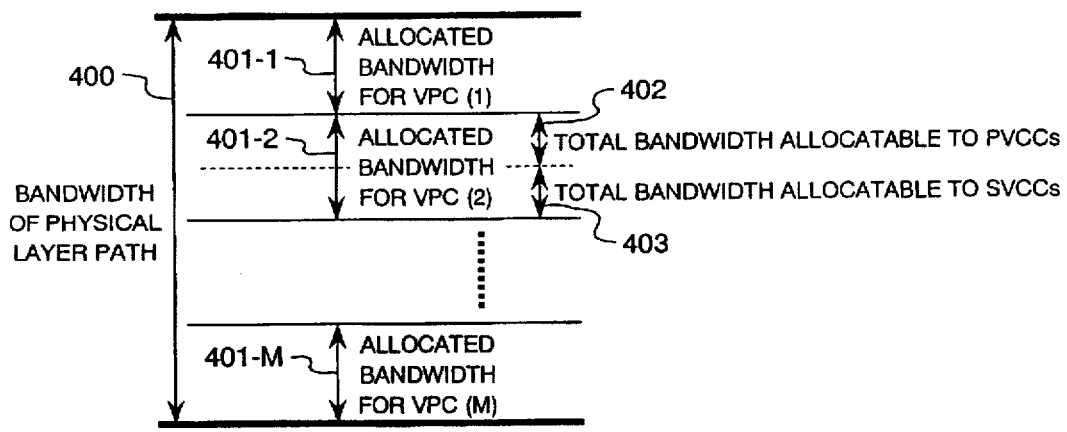
FIG. 6A is a drawing showing division of resources in the present invention.
FIG. 6B is a drawing showing a PVC and SVC allocation control table held by the allocation control part for PVC and SVC of the network management equipment.

FIG. 6B shows a table 500 for managing the aforementioned bandwidth division and identifier range which is held by the resource allocation control part for PVC and SVC. The table 500 has a first field 501 for indicating a network equipment identifying number for identifying a plurality of network equipments connected to the network management equipment and a second field 502 for indicating a line interface identifying number for identifying a plurality of line interfaces in the network equipment designated by the first field 501 and the physical layer paths are specified by these parameters. In correspondence with a plurality of VPCs multiplexed on each physical layer path, a record comprising a third field 503 for indicating a VPC identifying number for identifying a plurality of VPCs in the line interface designated by the second field 502, a fourth field 504 for indicating the allocated bandwidth for VPC designated by the third field 503, a fifth field 505 for indicating the total bandwidth allocatable to PVCC in the VPC designated by the third field 503, and a sixth field 506 for indicating the VCI range allocatable to PVCC in the VPC designated by the third field 503 is formed.

For example, assuming that VPC (2) shown in FIG. 6A is "network equipment identifying number=X, line interface identifying number=Y, VPC identifying number=2", in the example shown in FIG. 6B, it is found that the bandwidth 401-2 allocated to the aforementioned VPC (2) is 50 Mbit/s shown in the fourth field 504 of the second record in the table 500 and the total bandwidth allocatable to PVCC 402 among them is 10 Mbit/s shown in the fifth field 505.

The VCI range is divided by PVCC and SVCC fixedly. For example, in the VPC of "network equipment identifying number=X, line interface identifying number=Y, VPC identifying number=2", as shown in the sixth field 506 of the second record in the table 500, a value of 3FFFF (H) or less is allocated to PVCC.

In this embodiment, the total bandwidth allocatable to PVCC is indicated by a concrete bandwidth value. However, it may be indicated by the ratio to the allocated bandwidth of VPC. The same may be said with indication of the VCI range allocatable to PVCC.

Figure 7:
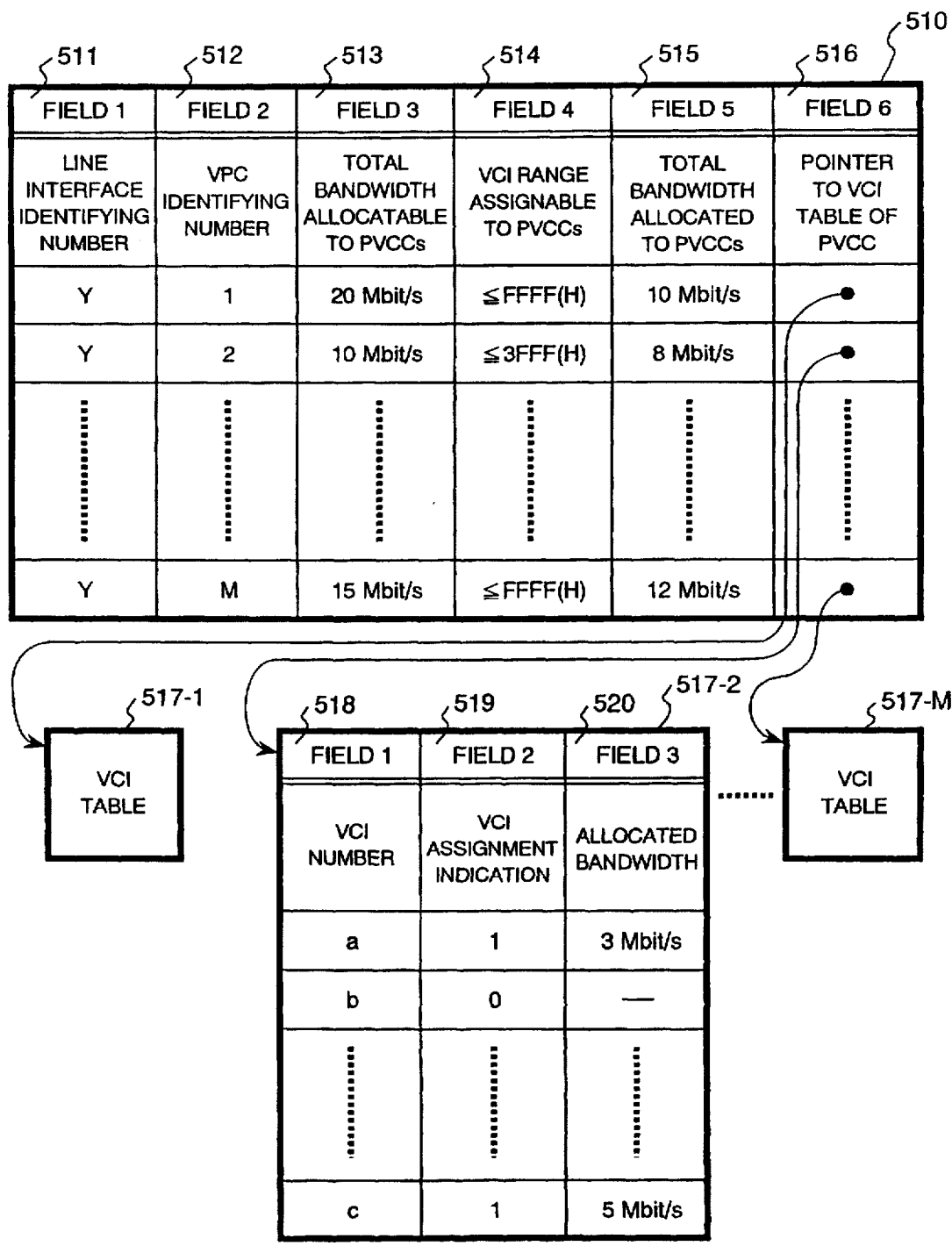
FIG. 7 is a drawing showing a resource management table for connection admission control for PVC held by the connection admission control part for PVC of the network management equipment.

FIG. 7 shows a resource management table 510 held by the connection admission control part for PVC 151.

In the resource management table 510, a plurality of records comprising a first field 511 for indicating a line interface identifying number, a second field 512 for indicating a VPC identifying number, a third field 513 for identifying the total value of bandwidths allocatable to PVCC, a fourth field 514 for identifying the VCI range allocatable to PVCC, a fifth field 515 for identifying the total value of allocated bandwidths to PVCC, and a sixth field 516 for indicating the pointer to VCI table of PVCC are recorded.

The pointer in the sixth field 516, as shown in the drawing, indicates the address of each of VCI tables 517-1 to 517-M. Each VCI table 517 includes at least one record comprising a first field 518 for indicating a VCI number, a second field 519 for indicating the VCI assignment indication, and a third field 520 for indicating the allocated bandwidth. The record that the VCI assignment indication in the second field is "0" indicates that the VCI number in the first field 518 is not allocated and the record that the second field is "1" indicates that the bandwidth indicated in the third field is allocated to the VCI number in the first field 518.

In the second field 519 in the VCI table 517 corresponding to a VCI number beyond the VCI range allocatable to PVCC shown in the fourth field 514 in the resource management table 510, the VCI assignment indication is set at "1" beforehand so that no PVCC is allocated to a VCI number beyond the VCI range allocatable to PVCC. The third field 520 corresponding to a VCI number beyond the VCI range allocatable to PVCC is kept empty.

When the VCI number is within the VCI range allocatable to PVCC and already allocated, a bandwidth is displayed in the third field 520. In the embodiment shown in the drawing, a bandwidth is allocated at the peak rate for simplicity (the same may said with the following explanation). In the VCI table 517-2, the total allocated bandwidth shown in the third field 520 is 8 Mbit/s and this total value (total bandwidth) is displayed in the fifth field 515 in the resource management table 510. By doing this, the connection admission control for PVC 151 can grasp the remaining bandwidth as a difference (in the example shown in the drawing, 10−8=2 Mbit/s) between the values of the third field 513 and the fifth field 515 in the resource management table 510, so that the connection admission control for PVC 151 can execute the connection admission control for PVC on the basis of the value of this remaining bandwidth.

Figure 8:
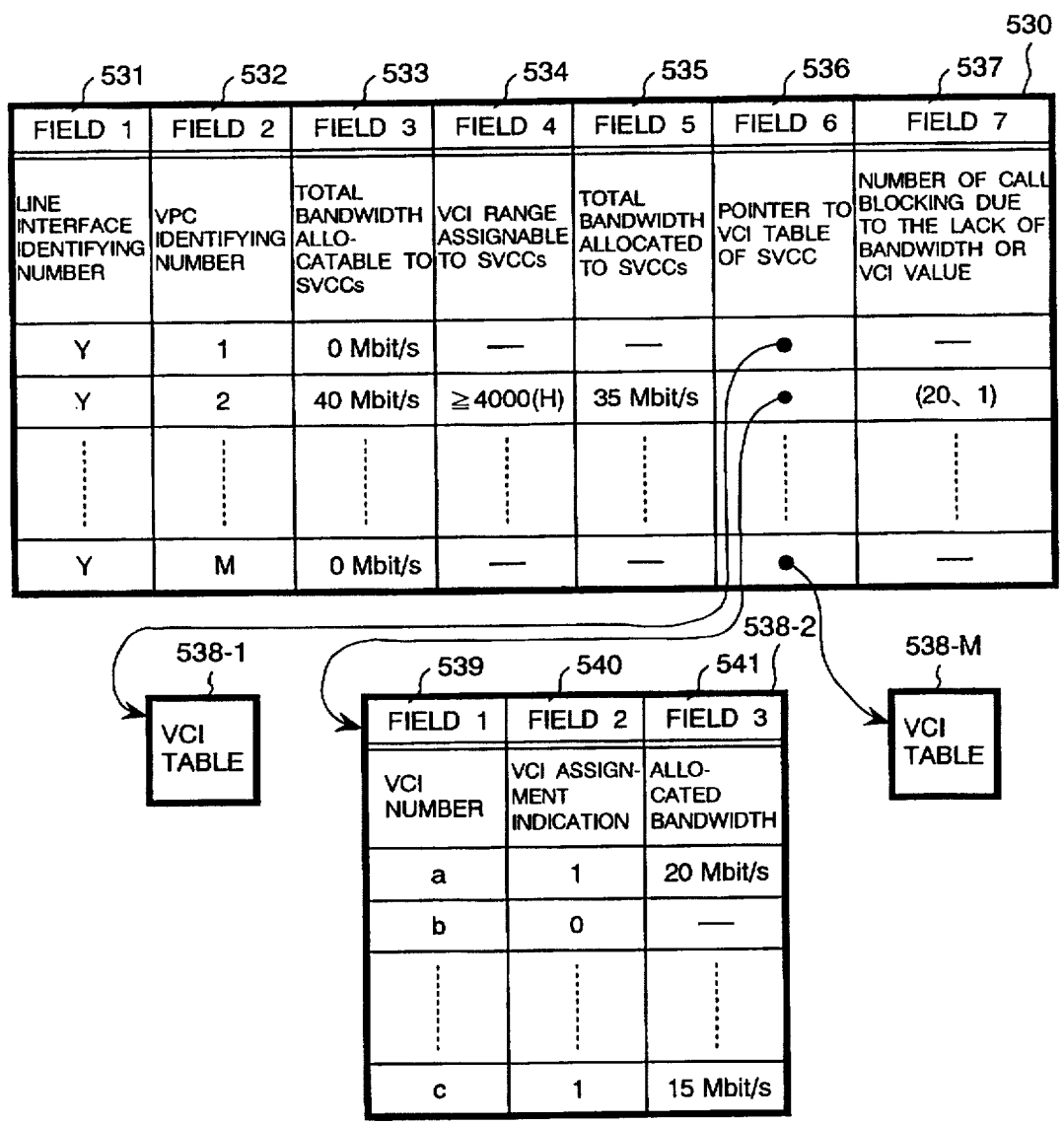
FIG. 8 is a drawing showing a resource management table for connection admission control for SVC held by the connection admission control part for SVC of the network equipment.

FIG. 8 shows a resource management table 530 held by the connection admission control part for SVC 251 in the network equipment 200.

Table 530 stores a plurality of records comprising a first field 531 for indicating a line interface identifying number, a second field 532 for indicating a VPC identifying number, a third field 533 for identifying the total value of bandwidths allocatable to SVCC, a fourth field 534 for identifying the VCI range allocatable to SVCC, a fifth field 535 for identifying the total value of allocated bandwidths to SVCC, a sixth field 536 for indicating the pointer to VCI table of SVCC, and a seventh field 537 for indicating the number of call blocking due to the lack of bandwidth or VCI value.

The pointer in the sixth field 536 indicates each of VCI tables 538-1 to 538-M. Each VCI table 538 stores at least one record comprising a first field 539 for indicating a VCI number, a second field 540 for indicating the VCI assignment indication, and a third field 541 for indicating the allocated bandwidth to each VCI. In the same way as with the aforementioned Table 517, the record that the VCI assignment indication is "0" indicates that the VCI number shown in the first field 539 is not allocated and the record that the VCI assignment indication is "1" indicates that the bandwidth shown in the third field is allocated to the VCI number shown in the first field 539.

For a VCI number beyond the VCI range allocatable to SVCC shown in the fourth field 534 in the table 530, the VCI assignment indication in the second field 540 in the VCI table 538 is set at "1" so that no SVCC is allocated. The third field 520 corresponding to a VCI number beyond the VCI range allocatable to PVCC is kept empty.

When the VCI number is within the VCI range allocatable to SVCC and the SVCC is already allocated, a bandwidth is displayed in the third field 520. In the embodiment shown in the drawing, in the VCI table 538-2, the total allocated bandwidth shown in the third field 541 is 35 Mbit/s and this value is displayed in the fifth field 535 of the second record in the table 530. By doing this, the connection admission control for SVC 251 can grasp the remaining bandwidth for each VPC as a difference (in the example shown in the drawing, 40−35=5 Mbit/s) between the values of the third field 533 and the fifth field 535 in the table 530, so that the connection admission control for SVC 251 can execute the connection admission control for SVC on the basis of the difference value.

During the connection admission control for SVC, when the remaining bandwidth is insufficient or the VCI numbers are all allocated and VCIs are insufficient, "1" is added to the value shown in the seventh field 537 and the sum is counted as the number of call blocking. In the example shown in the drawing, the number of call blocking is counted for each call blocking cause and it is found that the number of call blocking due to the lack of bandwidth is 20 and the number of call blocking due to the lack of VCI value is 1.

In this embodiment, the bandwidth and VCI range are divided fixedly for PVCC and SVCC. Therefore, for example, assuming that VPC (2) shown in FIG. 6A is "network equipment identifying number=X, line interface identifying number=Y, VPC identifying number=2", the bandwidth 401-2 allocated to the aforementioned VPC (2) is 50 Mbit/s shown in the fourth field 504 of the second record in the table 500, and the total bandwidth allocatable to PVCC 402 among them is 10 Mbit/s shown in the fifth field 505 of the second record, and this is displayed as 10 Mbit/s as for PVCC in the third field 513 of the second record equivalent to "line interface identifying number=Y, VPC identifying number=2" in the resource management table 510 held by the connection admission control for PVC 151, and the remaining "50−10=40 Mbit/s" is displayed as for SVCC in the third field 533 of the second record equivalent to "line interface identifying number=Y, VPC identifying number=2" in the resource management table 530 held by the connection admission control part for SVC 251.

The VCI range is displayed as "3FFF (H) or less" in the fourth field 514 of the second record equivalent to "line interface identifying number=Y, VPC identifying number= 2" in the resource management table 510, and on the other hand, it is displayed as "4000 (H) or more" in the fourth field 534 of the second record equivalent to "line interface identifying number=Y, VPC identifying number=2" in the resource management table 530, and it is found that the bandwidth is fixedly divided.

Next, the operation of the ATM system of the present invention will be explained by referring to FIGS. 9 to 13.

Figure 9:
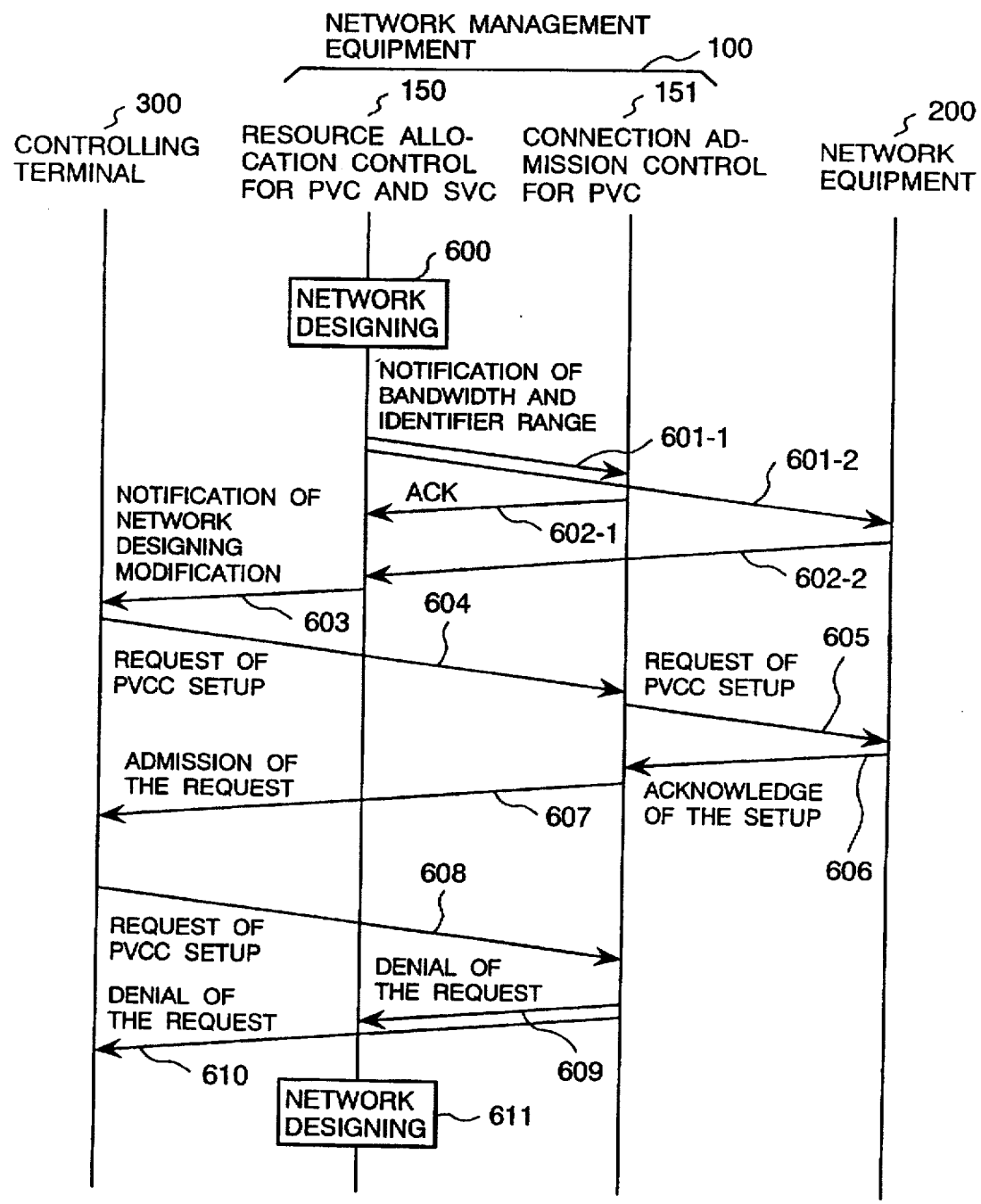
FIG. 9 is a sequence diagram for explaining an example of the PVCC setup operation of the present invention.

FIG. 9 shows a PVCC setup sequence. In this embodiment, the controlling terminal 300 requests PVCC setup and one network management equipment 100 executes the connection admission control.

Prior to the request of PVCC setup from the controlling terminal 300, the resource allocation control part for PVC and SVC 150 of the network management equipment 100 executes network designing (Step 600), decides division of VPC bandwidth, division (allocation) of PVCC and SVCC bandwidth in the VPC, and identifier allocation, and stores them in the table 500 shown in FIG. 6A. Notification to the network equipment 200 will be explained in detail in FIG. 10.

The notification of bandwidth and identifier range 601-1 to the connection admission control for PVC 151 sends the data to be set in the first field 511 to the fourth field 514 in the resource management table 510 shown in FIG. 7 on the basis of the content of each record in the table 500. On the other hand, the notification of bandwidth and identifier range 601-2 to the network equipment 200 sends the data to be set in the first field 531 to the fourth field 534 in the resource management table 530 shown in FIG. 8 on the basis of the content of the record corresponding to the network equipment identifying number of the network equipment 200 in the table 500.

The resource allocation control part for PVC and SVC 150 waits for responses from the connection admission control for PVC 151 and the network equipment 200 and when it receives acknowledge signals (ACK) 602-1 and 602-2, it sends a notification of network designing modification 603 to the controlling terminal 300. The notification of network designing modification is executed via the controlling terminal interface 105 under control of the driver software for controlling terminal 153 shown in FIG. 3.

A request of PVCC setup 604 from the controlling terminal 300 is executed in the state that the aforementioned network designing is acknowledged and a message of request of PVCC setup is inputted to the connection admission control for PVC 151 via the controlling terminal interface 105 and the driver software for controlling terminal 153. When the connection admission control for PVC 151 receives the request of PVCC setup 604, it executes the admission control with reference to the resource management table 510 shown in FIG. 7. For example, when a PVCC with a bandwidth of 1 Mbit/s is newly set in PVC of an identifier number of "2" which is shown in the second record in the resource management table 510, the connection admission control for PVC 151 refers to the third field 513 and the fifth field 515. In this case, there is a remaining bandwidth of "10−8=2 Mbit/s", so that it is found that the bandwidth of 1 Mbit/s of PVCC can be reserved. Therefore, the connection admission control for PVC 151 refers to the VCI table 517-2 on the basis of the pointer shown in the sixth field 516 and searches for a VCI number in the empty state "0" by scanning the second field 519. In the example shown in FIG. 7, VCI number=b is not allocated, so that the connection admission control for PVC 151 rewrites the VCI assignment indication in the second field 519 from "0" to "1", sets a bandwidth of 1 Mbit/s in the third field, and then adds the bandwidth 1 Mbit/s allocated now to the value (8 Mbit/s) of the fifth field 515 in the second record in the resource management table 510 (as a result, the value is rewritten to 9 Mbit/s).

The admission control is acknowledged by the aforementioned operation and the connection admission control for PVC 151 notifies the network equipment 200 of a request of PVCC setup 605 having the aforementioned bandwidth value and the VCI identifier according to the communication procedure which is already known.

When the network equipment 200 receives the request of PVCC setup 605, the connection setup control part for PVC and SVC 252 sets parameters in the line interface 207 via the driver software for speech path device 254 and the speech path device interface 205 on the basis of the received bandwidth value and VCI identifier and sets connection on the predetermined line. Thereafter, the connection setup control part for PVC and SVC 252 returns acknowledge of the setup 606 to the network management equipment 100. Sending and receiving of these signals 605 and 606 between the network management equipment 100 and the network equipment 200 are executed via the network equipment interface 106 under control of the driver software for network equipment 154 on the side of the network management equipment 100 and via the network management equipment interface 204 under control of the driver software for network management equipment 253 on the side of the network equipment 200. When the connection admission control for PVC 151 receives the acknowledge of the setup 606 from the network equipment 200, it notifies the controlling terminal 300 of admission of the request 607.

The above-mentioned is a case that the connection admission control for PVC 151 acknowledges the admission. The operation in the case of denial of admission is shown below.

For example, assuming that a request of PVCC setup 608 from the controlling terminal 300 is a request of new PVCC setup with a bandwidth of 3 Mbit/s in the VPC of "line interface identifying number=Y, VPC identifying number= 2", the connection admission control for PVC 151 refers to the second record in the resource management table 510 and finds that the bandwidth remaining at present is "10–8=2 Mbit/s" from the total value of allocatable bandwidths shown in the third field 513 and the total value of allocated bandwidths shown in the fifth field 515. In this case, the newly requested PVCC bandwidth of 3 Mbit/s cannot be reserved. Therefore, the connection admission control for PVC 151 notifies the resource allocation control part for PVC and SVC 150 of denial of the request 609 having insufficient bandwidths (or identifier range) and the identifying number to which PVCC belongs. When the resource allocation control part for PVC and SVC 150 receives the denial of the request 609, it notifies the controlling terminal 300 of denial of the request 610 and then executes network designing 611 again. The resource allocation control part for PVC and SVC 150 reserves a necessary resource by the network designing 611 and repeats the same sequence after the aforementioned network designing 600 and hence a new PVCC can be set.

Figure 10:
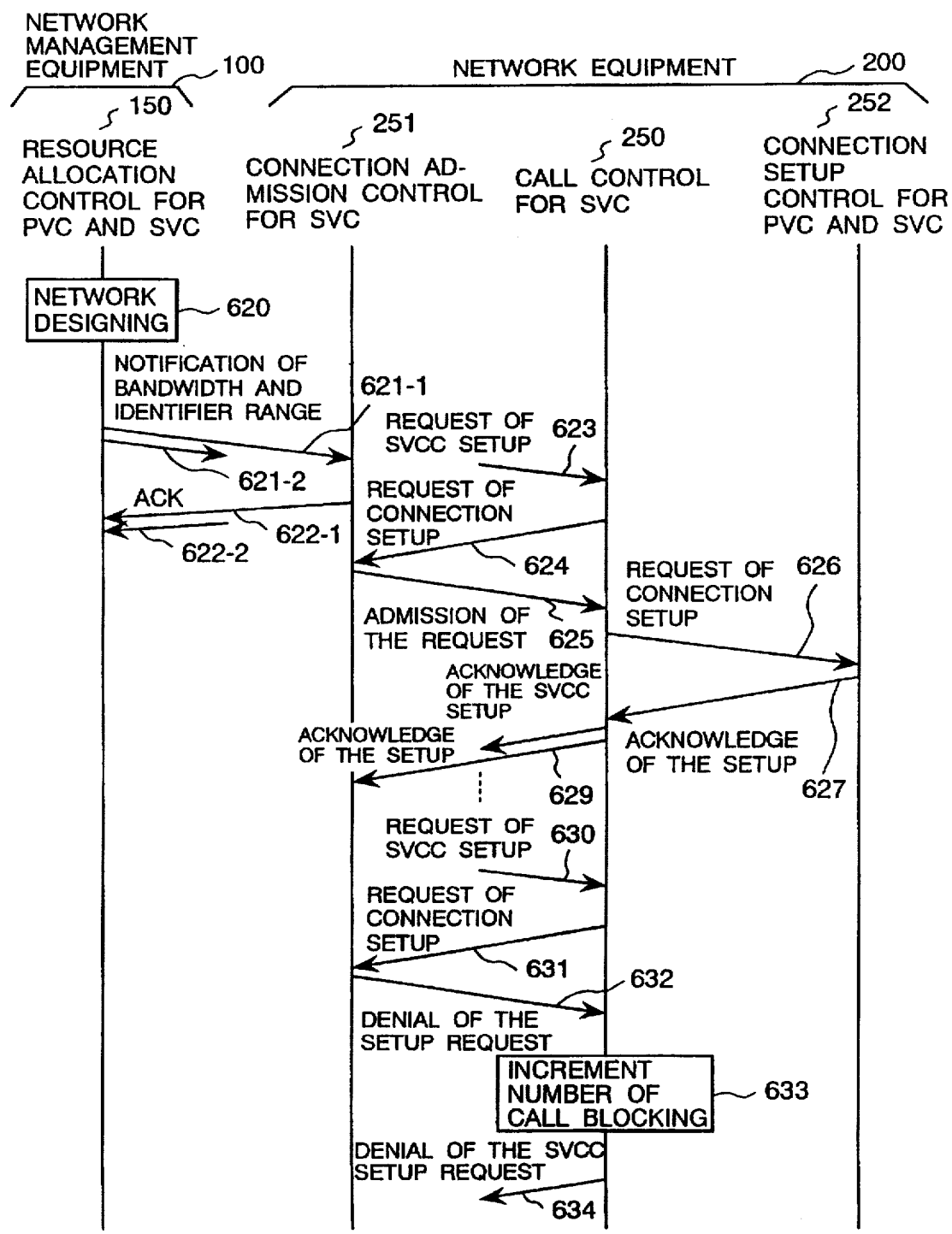
FIG. 10 is a sequence diagram for explaining an example of the SVCC setup operation of the present invention.

FIG. 10 shows a SVCC setup sequence.

The resource allocation control part for PVC and SVC 150 executes network designing 620 which is the same as that explained in FIG. 9, executes division of VPC bandwidth and allocation of PVCC and SVCC bandwidths in the VPC and respective identifier ranges, and stores them in the table 500 shown in FIG. 6B. The bandwidth and identifier range decided above are notified to the connection admission control for PVC 151 and the connection admission control for SVC 251 of the network equipment 200 respectively (621-1, 621-2). The notification of bandwidth and identifier range 621-2 to the connection admission control for PVC 151 is the same as the notification 601-1 explained in FIG. 9.

The notification of bandwidth and identifier range 621-1 to the connection admission control part for SVC 251 notifies the data to be set in the first field 531 to the fourth field 534 in the resource management table 530 shown in FIG. 8 on the basis of the content of the record corresponding to the network equipment identifying number of the network equipment 200 in the table 500 in the same way as with the notification 601-2 explained in FIG. 9. This notification is executed via the network management equipment interface 204 under control of the driver software for network management equipment 253.

Figure 12:
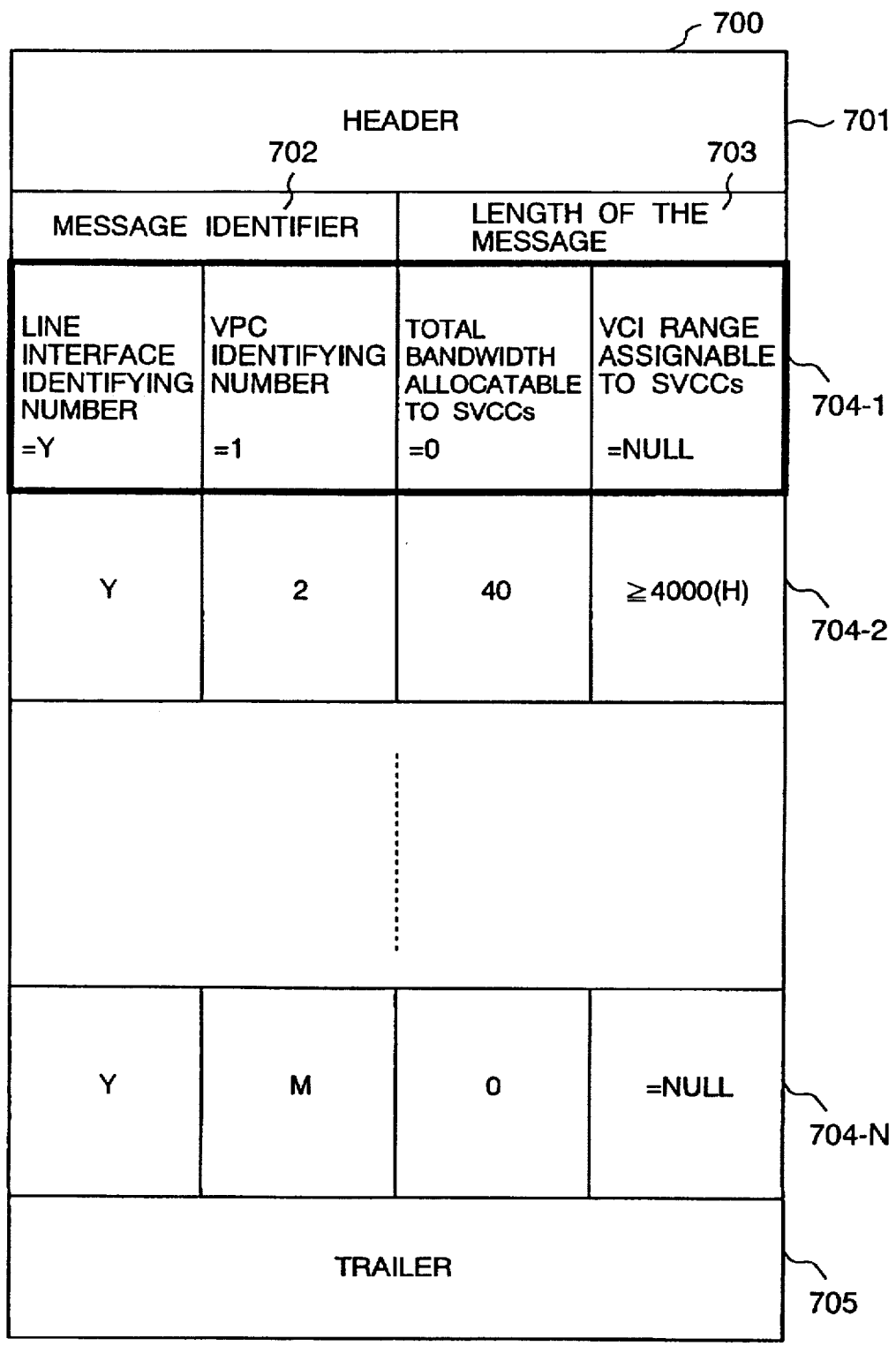
FIG. 12 shows a diagram showing the packet format for resource notification to the network equipment from the network management requirement.
Figure 14:
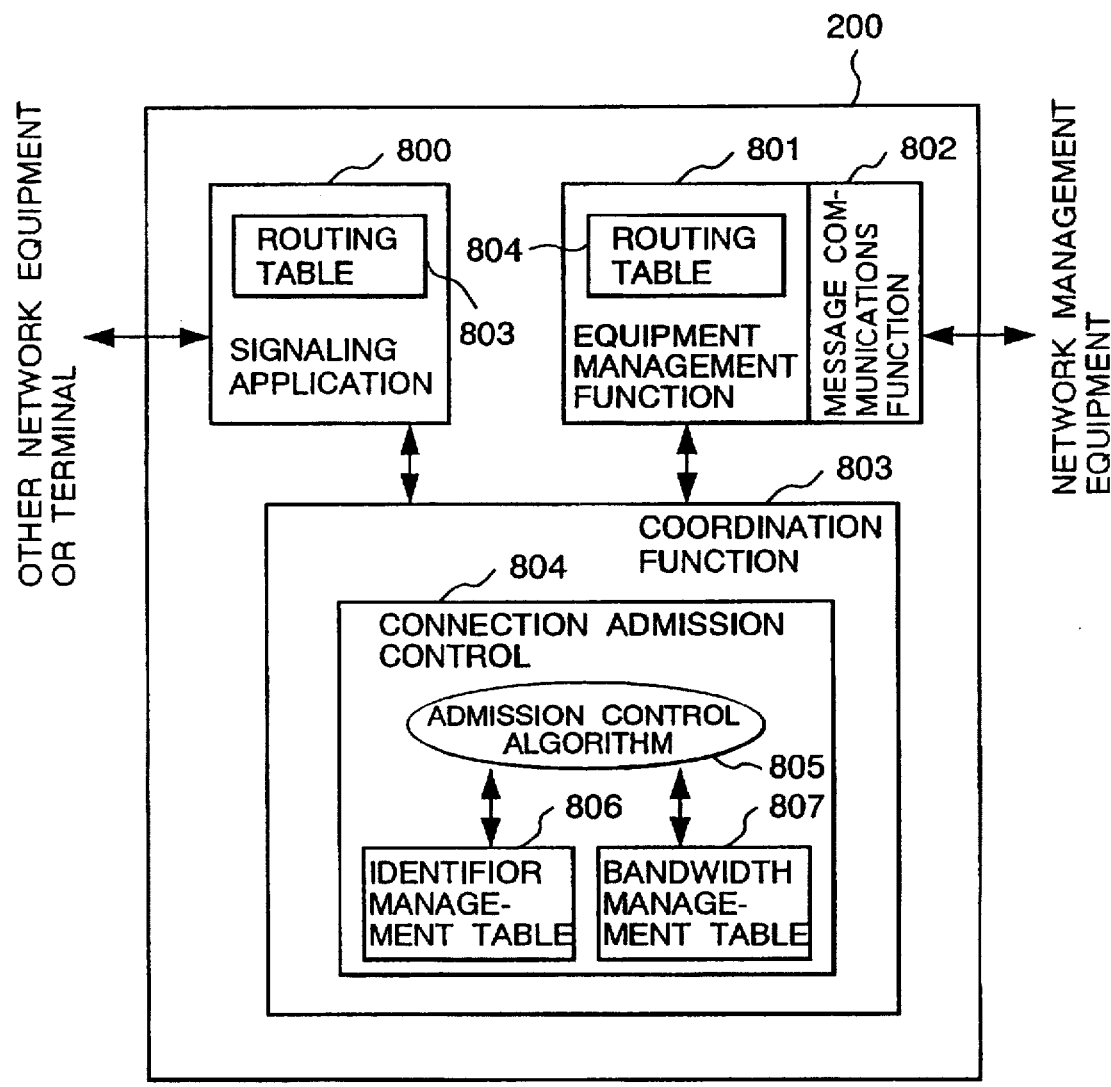
FIG. 14 is a drawing for explaining the resource management function of the prior art.

FIG. 12 shows an example of the format of a packet 700 used in the aforementioned notification 621-1. The packet 700 is structured so that it has a header (including destination information) 701 according to the communication protocol at the top, and a message identifier field 702, a message length field 703, and a data field 704 (704-1 to 704-N) including the bandwidth and identifier range behind the header 701, and a trailer (including an error control code) 705 at the end. In the message identifier field 702, a code indicating that this packet is for notification of the bandwidth and identifier range is set.

When the resource allocation control part for PVC and SVC 150 receives acknowledge signals (ACK) 622-1 and 622-2 to the aforementioned notification from the connection admission control for PVC 151 and the connection admission control for SVC 251, it performs the same operation as that explained in FIG. 9.

When a request of SVCC setup 623 is issued to the network equipment 200 from other network equipment or the terminal equipment in the state that the network designing is acknowledged like this, the ATM cell indicating the request of SVCC setup 623 is inputted from the line interface 207 to the ATM switch 208, routed to the signaling processing device 209, and delivered to the call control part for SVC 250 via the signaling device interface 206 and the driver software for signaling device 255.

The call control part for SVC 250 decides necessary connection and notifies the connection admission control for SVC 251 of a request of connection setup 624.

The connection admission control for SVC 251 received the request of connection setup 624 performs the admission control by referring to the resource management table 530. For example, if the connection admission control for SVC 251 refers to the third field 533 and the fifth field 535 of the second record in the table 530 shown in FIG. 8 when an SVCC with a bandwidth of 1 Mbit/s is newly set in the VPC having a VPC identifying number of "2", it is found that there is a remaining bandwidth of "40–35=5 Mbit/s", so that the requested SVCC bandwidth of 1 Mbit/s can be reserved.

The connection admission control for SVC 251 refers to the VCI table 538-2 on the basis of the pointer set in the sixth field 536 of the second record and searches for a VCI number in the empty state "0" at present by scanning the second field 540 showing the VCI assignment indication. In the example shown in FIG. 8, the VCI number "b" stored in the second record is detected first as an empty VCI, so that the connection admission control for PVC 151 rewrites the VCI assignment indication from "0" to "1" in the second field 540 of the second record, adds the bandwidth "1 Mbit/s" newly allocated now to the value "35 Mbit/s" of the fifth field 535 indicating the total value of allocated bandwidth for SVCC in the corresponding record in the resource management table 530, and rewrites it to "36 Mbit/s". By doing this, the admission control is acknowledged and the connection admission control for SVC 251 notifies the call control part for SVC 250 of admission of the setup request 625.

The call control part for SVC 250 notifies the connection setup control for PVC and SVC 252 of a request of connection setup 626 having the aforementioned allocated bandwidth value and an identifier and waits for acknowledge of the setup 627 from the connection setup control for PVC and SVC 252. The connection setup control for PVC and SVC 252 sets a new SVCC by sending the control parameter to the line interface 207 and the ATM switch 208 via the driver software for speech path device 254 and the speech path device interface 205 and sends acknowledge of the setup 627 to the call control part for SVC 250.

When the call control part for SVC 250 receives the acknowledge of the setup 627, it sends acknowledge of the setup 628 to other network equipment or the terminal equipment which is a destination of the request of SVCC setup in the message format according to the protocol and also notifies the connection admission control for SVC 251 of acknowledge of the setup 629.

The above-mentioned is the operation sequence when the request of SVCC setup is admitted by the connection admission control for SVC 251. The operation sequence when the request of SVCC setup is denied is shown below.

When a request of SVCC setup 630 from other network equipment or the terminal equipment is inputted to the call control part for SVC 250, in the same way as with the aforementioned request 623, a request of connection setup 631 is issued to the connection admission control for SVC 251 from the call control part for SVC 250. Assuming that the aforementioned request of connection setup 631 is a request of new SVCC setup with a bandwidth of 6 Mbit/s in the VPC of "line interface identifying number=Y, VPC identifying number=2", the connection admission control for SVC 251 refers to the corresponding second record in the resource management table 530 shown in FIG. 8 and judges that the remaining bandwidth is only "40−35=5 Mbit/s" from the bandwidth value shown in the third field 533 and the bandwidth value shown in the fifth field 535 and the requested SVC bandwidth of 6 Mbit/s cannot be reserved.

In this case, to count up the number of call blocking due to the lack of bandwidth, the connection admission control for SVC 251 rewrites the value "(20, 1)" stored in the seventh field 537 to "(21, 1)" and notifies the call control part for SVC 250 of denial of the setup request 632 having insufficient bandwidths (or identifier range) and the identifying number to which SVCC belongs. When the call control part for SVC 250 receives the aforementioned notification of denial of the setup request, it executes increment of number of call blocking 633 of call blocking due to impossibility of the received connection admission in correspondence with PVC and call blocking (call processing error, etc.) due to the other reasons and then it sends denial of the SVCC setup request 634 to other network equipment or the terminal equipment which is a destination of the request of SVCC setup in the message format according to the protocol.

Figure 11:
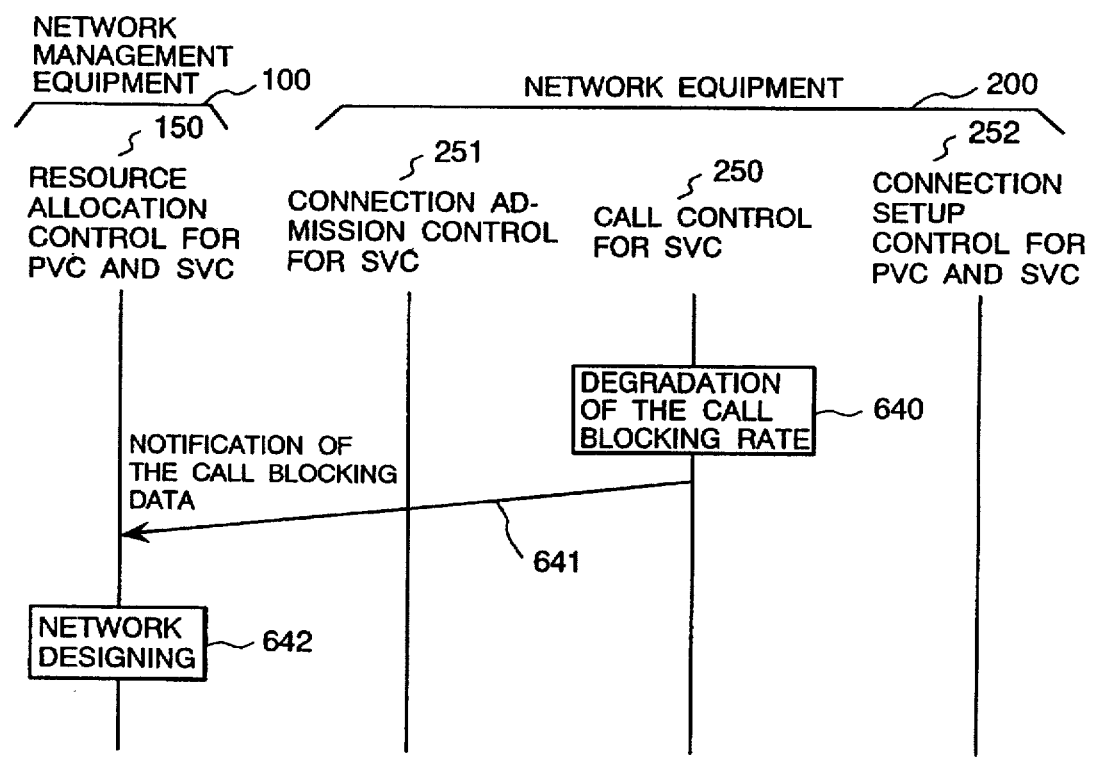
FIG. 11 is a sequence diagram for explaining the operation when degradation of the call blocking rate occurs in SVCC setup of the present invention.

FIG. 11 shows the operation sequence when the number of call blocking counted by the call control for SVC 250 using the increment of number of call blocking 633 increases gradually and the call blocking rate is degraded below the predetermined threshold value (referred to as degradation of the call blocking rate).

When one of PVCs enters the state of degradation of the call blocking rate (Step 640), the call control for SVC 250 issues a notification of the call blocking data 641 having the corresponding VPC identifying number and call blocking parameter to the network management equipment 100. The notification of the call blocking data 641 is sent to the network management equipment 100 via the network management equipment interface 204 under control of the driver software for network management equipment 253.

FIG. 13 shows an example of the format of a packet 706 used for notification of call blocking.

The packet 700 comprises, in the same way as with the packet 700 of notification of bandwidth and identifier range shown in FIG. 12, a header (including destination information) 707 according to the communication protocol, and a message identifier field 708, a message length field 709, and a data field 710 (710-1 to 710-N) for setting call blocking data behind the header 707, and a trailer (including an error control code) 711 forming the end of the packet.

In the message identifier field 708, a code indicating that this packet is for notification of call blocking is set and in the data field 710, the line interface number in which call blocking occurs, the VPC identifying number, and the number of call blocking occurred are set for each cause (in this example, the number of call blocking due to the lack of bandwidth and the number of call blocking due to the lack of VCI value). In the network management equipment 100, the notification of the call blocking data 641 is inputted to the resource allocation control for PVC and SVC 150, and network designing 642 is executed so as to eliminate the call blocking in PVC in which degradation of the call blocking rate occurs, and hereafter the same sequence as the network designing 600 and the subsequent steps shown in FIG. 9 is repeated.

As the above explanation shows, according to the present invention, since the PVC connection admission control function is arranged in the network management equipment and the SVC connection admission control function is arranged in the network equipment, by executing the connection admission control in the network management equipment for PVC setup first and issuing an instruction of PVC setup to the network equipment according to the result of admission control, only one message communication between the network management equipment and the network equipment is made necessary.

Furthermore, since the PVC connection admission control function is arranged in the network management equipment and the SVC connection admission control function is arranged in the network equipment, the connection admission control for PVC and the connection admission control for SVC can be executed independently of each other and the number of call blocking for SVC can be counted under the connection admission control for SVC.

According to the present invention, the total bandwidth allocatable to each of PVCC and SVCC coexisting in the same VPC and the VCI range are decided during network designing executed in the network management equipment, and they are notified to the PVC connection admission control function in the network management equipment and the SVC connection admission control function in the network equipment, and the PVC connection admission control function executes the connection admission control on the basis of the total bandwidth allocatable to the aforementioned PVCC and the VCI range, and if lack of resources occurs, a request of change of network designing is issued, and the SVC connection admission control function in the network equipment executes the connection admission control on the basis of the total bandwidth allocatable to SVCC and the VCI range notified from the network management equipment, and if lack of resources occurs, it is counted as call blocking, and at the point of time when the call blocking rate is degraded below the predetermined threshold value, change of network designing is requested to the network management equipment by notifying of degradation of the call blocking rate, and hence the connection admission control with PVC and SVC coexisting in the same layer can be executed.

We claim:

1. An ATM network system for multiplexing a plurality of connections in a state that permanent virtual connections (PVC) and switched virtual connections (SVC) coexist on the same line, comprising:

a network management equipment; and a network equipment, wherein said network management equipment comprises:

a resource allocation control part for deciding the bandwidth of each of a plurality of virtual path connections (VPCs) and resource allocation to PVC and SVC multiplexed on each VPC to be multiplexed on each line accommodated in said network equipment and notifying said network equipment of a result of resource allocation to SVC, and a connection admission control part for PVC for executing connection admission control based on a result of resource allocation to PVC decided by said resource allocation control part when a request of PVC setup is issued from a controlling terminal, and sending source specific information allocated to said PVC to said network equipment, and wherein said network equipment comprises:

a connection admission control part to SVC for executing connection admission control for a request of SVC setup from a controlling terminal or other network equipment based on said result of resource allocation to SVC notified from said network management equipment, and a connection setup control part for performing connection setup operation on said line according to resource definition information allocated to SVC by said connection admission control part to SVC and PVC resource definition information received from said network management equipment.

2. An ATM network system according to claim 1, wherein said network equipment has means for counting as the number of call blocking corresponding to a virtual channel identifier (VCI) when resources cannot be allocated to said request of SVC setup and sending control information including the VPC identifier corresponding to said call blocking to said network management equipment when the number of call blocking reaches the predetermined threshold value.

3. An ATM network system according to claim 2, wherein said network equipment comprises a plurality of line interfaces installed in correspondence with lines, switches connected to said line interfaces, a call control processor connected to said line interfaces and said switches, and an interface for connecting said call control processor and said network management equipment and said connection admission control part for SVC and said connection setup control part comprise software executed by said call control processor.

4. An ATM network system according to claim 1, wherein said network management equipment has a first resource management table for storing the VPC identifier to be multiplexed on each line, the bandwidth allocated to each VPC, the total bandwidth of PVC multiplexable in each VPC, and the VCI range allocatable to said PVC in correspondence with each line accommodated in said network equipment and a second resource management table for storing the total bandwidth of PVC multiplexable in each VPC, the VCI range allocatable to said PVC, the total bandwidth of allocated PVC, and the allocated bandwidth of each VCI in correspondence with the VPC identifier to be multiplexed on each line, and said resource allocation control part stores said resource allocation result in said first resource management table, and said connection admission control part for PVC stores said resource allocation result for PVC in said second resource management table and executes connection admission control for said request of PVC setup from said controlling terminal by referring to said second resource management table.

5. An ATM network system according to claim 4, wherein said network equipment has means for counting as the number of call blocking corresponding to VCI when resources cannot be allocated to said request of SVC setup and sending control information including the VPC identifier corresponding to said call blocking to said network management equipment when the number of call blocking reaches the predetermined threshold value.

6. An ATM network system according to claim 5, wherein said network equipment comprises a plurality of line interfaces installed in correspondence with lines, switches connected to said line interfaces, a call control processor connected to said line interfaces and said switches, and an interface for connecting said call control processor and said network management equipment and said connection admission control part for SVC and said connection setup control part comprise software executed by said call control processor.

7. An ATM network system according to claim 4, wherein said network equipment has a third resource management table for storing the total bandwidth of SVC multiplexable in each VPC, the VCI range allocatable to said SVC, the total bandwidth of allocated SVC, and the allocated bandwidth of each VCI in correspondence with the VPC identifier to be multiplexed on each line, and said connection admission control part for SVC stores said resource allocation result for SVC notified from said network management equipment in said second resource management table and executes connection admission control for said request of SVC setup by referring to said third resource management table.

8. An ATM network system according to claim 7, wherein said network equipment has means for counting as the number of call blocking corresponding to VCI when resources cannot be allocated to said request of SVC setup and sending control information including the VPC identifier corresponding to said call blocking to said network management equipment when the number of call blocking reaches the predetermined threshold value.

9. An ATM network system according to claim 8, wherein said network equipment comprises a plurality of line interfaces installed in correspondence with lines, switches connected to said line interfaces, a call control processor connected to said line interfaces and said switches, and an interface for connecting said call control processor and said network management equipment and said connection admission control part for SVC and said connection setup control part comprises software executed by said call control processor.

10. An ATM network system comprising:

a network management equipment; and a network equipment,
wherein said network management equipment comprises:
  means for deciding the bandwidth of each of a plurality of virtual path connections (VPCs) and resource allocation to a permanent virtual connection (PVC) and a switched virtual connection (SVC) multiplexed on each VPC to be multiplexed on each line accommodated in said network equipment and notifying said network equipment of a result of resource allocation to SVC, and
  means for executing connection admission control for PVC based on a result of resource allocation to PVC when a request of PVC setup is issued from outside and notifying said network equipment of source definition information allocated to said PVC of setup request, and
wherein said network equipment comprises:
  means for executing connection admission control for SVC in response to a request of SVC setup from a controlling terminal or other network equipment based on said result of resource allocation to SVC notified from said network management equipment,
  means for performing a new connection setup operation on said line according to the resource definition information allocated to SVC by said connection admission control part to SVC and the PVC resource definition information notified from said network management equipment, and
  means for counting as a number of call blocking corresponding to the VPC identifier when resources cannot be allocated to said request of SVC setup in said connection admission control for SVC and sending call blocking notification information including the VPC identifier to said network management equipment at a point of time when said number of call blocking reaches a predetermined threshold value.

11. An ATM network system according to claim 10, wherein said network management equipment reallocates said resources in response to reception of said call blocking notification information from said network equipment.

12. An ATM network system according to claim 10, wherein said network equipment counts said number of call blocking for each call blocking cause.

13. An ATM network system according to claim 12, wherein said network management equipment reallocates said resources in response to reception of said call blocking notification information from said network equipment.

14. A network management equipment connected to at least one network equipment constituting an ATM network, comprising:
  first means for deciding the bandwidth of each of a plurality of virtual path connections (VPCs) and resource allocation to a permanent virtual connection (PVC) and a switched virtual connection (SVC) multiplexed on each VPC to be multiplexed on each line accommodated in said network equipment and notifying said network equipment of a result of resource allocation to SVC; and
  second means for executing connection admission control for PVC in response to a request of PVC setup from a controlling terminal based on a result of resource allocation to PVC and notifying said network equipment of resource definition information allocated to PVC.

15. A network management equipment according to claim 14, wherein said first means divides definitely the bandwidth of VPC in which PVC and SVC coexist and decides the bandwidth to be allocated to PVC and the bandwidth to be allocated to SVC in each bandwidth.

16. A network management equipment according to claim 14, wherein said first means divides definitely the virtual channel identifier (VCI) range to be allocated to PVC and the VCI range to be allocated to SVC in correspondence with each VPC.

17. A network management equipment according to claim 14, wherein said first means has a function for changing the VPC bandwidth and said resource allocation to PVC and SVC.

18. A network management equipment according to claim 17, wherein said first means changes the definite division ratio of said PVC bandwidth and said SVC bandwidth when said resource allocation and allocation result notification means receives said control information indicating occurrence of call blocking.

19. A network management equipment according to claim 17, wherein said first means changes the definite division ratio of said VCI range to be allocated to PVC and SVC when said resource allocation and allocation result notification means receives said control information indicating occurrence of call blocking.

20. A connection admission control method in an ATM system comprising a network management equipment and a network equipment wherein connection is multiplexed in the state that permanent virtual connections (PVC) and switched virtual connections (SVC) coexist on lines accommodated in said network equipment, comprising:
  a first step of executing resource allocation for PVC and SVC by said network management equipment;
  a second step of storing resource management information allocated to PVC in said network management equipment;
  a third step of notifying said network equipment of resource management information allocated to SVC by said network management equipment;
  a fourth step of executing the connection admission control for PVC by said network management equipment on the basis of said resource management information allocated to PVC when a request of PVC setup is issued and notifying said network equipment of parameter information with regard to said resource allocated to PVC;
  a fifth step of setting PVC on the predetermined line by said network equipment according to said parameter information of said PVC resource; and
  a sixth step of executing the connection admission control for SVC by said network equipment on the basis of said resource management information allocated to SVC when a request of SVC setup is issued and setting SVC on the predetermined line according to said resource parameter information allocated to SVC.

21. A connection admission control method according to claim 20, wherein said resource management information notified said network equipment from said network management equipment at Step 3 comprises identification information for specifying VPC for multiplexing SVC, bandwidth allocatable to SVC, and virtual channel identifier range information allocatable to SVC.

22. A connection admission control method according to claim 20, further comprising:
  a seventh step of measuring the SVC service quality by said network equipment under the connection admission control to said request of SVC setup;

a eighth step of notifying said network management equipment of a parameter indicating said SVC service quality by said network equipment at the predetermined timing; and a ninth step of executing resource reallocation for PVC and SVC according to said parameter indicating said SVC service quality by said network management equipment.

23. A connection admission control method according to claim 22, wherein said parameter indicating said service quality notified said network management equipment from said network equipment at Step 8 comprises information for specifying SVC and data indicating call blocking occurred in said SVC.

24. A connection admission control method according to claim 23, wherein said resource management information notified said network equipment from said network management equipment at Step 3 comprises identification information for specifying VPC for multiplexing SVC, bandwidth allocatable to SVC, and virtual channel identifier range information allocatable to SVC.

* * * * *